No. 12,713. REISSUED OCT. 29, 1907.

B. B. BUSH.

WATER MOTOR WHEEL.

APPLICATION FILED MAY 31, 1906.

Witnesses:
E. L. Taylor.
John Enders.

Inventor:
Bertrand B. Bush,
By Dyrenforth, Dyrenforth, Lee & Wiles.
Att'ys.

THE NORRIS PETERS CO., WASHINGTON, D. C.

UNITED STATES PATENT OFFICE.

BERTRAND B. BUSH, OF CHICAGO, ILLINOIS, ASSIGNOR, BY DIRECT AND MESNE ASSIGNMENTS, OF ONE-HALF TO FREDERICK H. KNAPP AND ONE-HALF TO EMMA BUSH, BOTH OF CHICAGO, ILLINOIS.

WATER-MOTOR WHEEL.

No. 12,713. Specification of Reissued Letters Patent. Reissued Oct. 29, 1907.

Original No. 817,546, dated April 10, 1906, Serial No. 247,029. Application for reissue filed May 31, 1906. Serial No. 319,654.

*To all whom it may concern:*

Be it known that I, BERTRAND B. BUSH, a citizen of the United States, residing at Chicago, in the county of Cook and State of Illinois, have invented a new and useful Water-Motor Wheel, of which the following is a specification.

Figure 1:
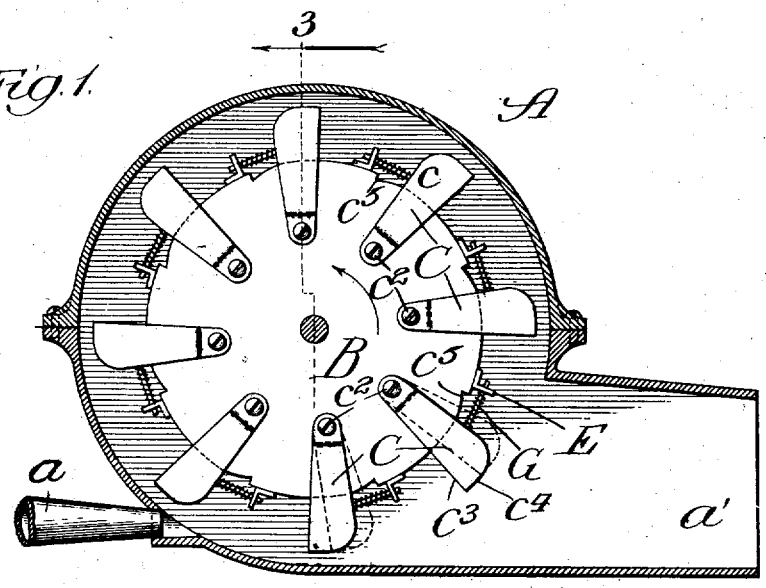
Figure 2:
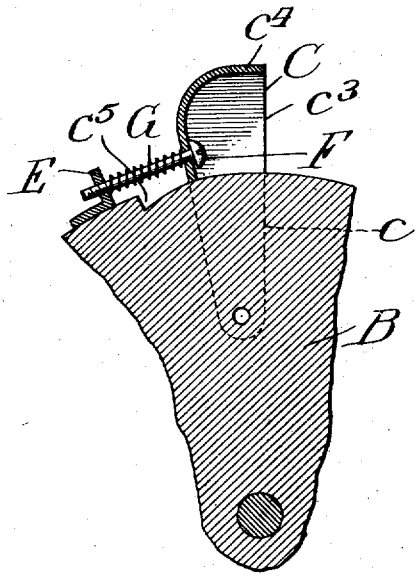
Figure 3:
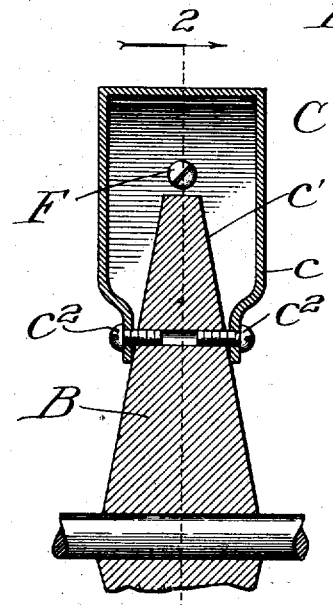

My invention relates particularly to improvements in water-driven motors; and my primary object is to provide a motor of this character of improved general construction capable of attaining high speed, and producing great power on a small consumption of fluid, free from shock in case of variation in the water pressure, having facilities for the proper adjustment of the buckets independently of each other, and free from undue friction or retardation caused by water being carried around with the buckets. I attain these objects by the mechanism illustrated in the accompanying drawing, in which Figure 1 is a side elevational view of the wheel with the casing in section; Fig. 2, a section of a portion of the wheel-body and of a bucket at line 2 of Fig. 3; and Fig. 3, a section of the same parts taken as indicated at line 3 of Fig. 1.

The motor comprises a casing, A, and a wheel, B, carrying hinged or movable buckets, C, connected to lugs, E, on the periphery of the wheel-body, by bolts, F, passing through the bottoms of the buckets and through coil springs, G, confined between the bottoms of the buckets and the lugs E. The bolts, F, may comprise screws with their shanks passing freely through the openings in the bottoms of the buckets and their heads located within the buckets, the extremities of the screws beipg threaded into the lugs, E. Each bucket, C, preferably is of the elongated form shown, having a slotted or bifurcated shank, $c$, which fits freely over the peripheral portion of the wheel-body, said peripheral portion of the wheel-body being approximately V-shaped, as indicated at, $c^1$. The shank of each bucket is pivotally connected with the wheel-body at a distance from the periphery of the wheel, as by screws, $c^2$. The buckets have rearwardly turned side flanges, $c^3$, and a rearwardly curved outer end flange, $c^4$. The wheel-body is provided with peripheral recesses, $c^5$, the curved surfaces thereat being struck on radii from the pivots of the buckets, so that the buckets can turn upon their pivots, compressing the springs, when a jet of water is encountered.

The construction provides for individual adjustment of the buckets, the adjustment of the tension upon the buckets and the cushioning of the buckets against spurts or variation in pressure of the jets, thereby avoiding undue shock upon the wheel. The form of the wheel-body and the construction and disposition of the buckets are such as to insure the water passing from the wheel in such manner as to prevent undue retardation of the wheel. The water enters the casing through the nozzle, $a$, and leaves the casing through a flume, $a^1$. The direction of rotation of the wheel is indicated by the arrow.

What I regard as new, and desire to secure by Letters Patent, is—

1. The combination, with the body of a wheel with a V-shaped edge, having mounted upon its periphery, a series of lugs, elongated, cup-shaped buckets, pivoted upon the sides of the wheel at their inner ends, bolts passing through the bottoms of the buckets, and threaded into said lugs, with springs upon the bolts, between the buckets and lugs, substantially as described.

2. The combination of a wheel-body having a V-shaped edge, a series of buckets having bifurcated shanks embracing the V-shaped edge of the wheel-body, and rearwardly turned side and end flanges, pivots connecting said shanks with the wheel-body at a distance from the periphery of the body, and means for yieldingly holding the buckets in a given position with relation to the wheel-body.

3. The combination of a wheel-body, buckets having slots receiving the periphery of the wheel-body, pivots connecting the shanks of the buckets with the wheel-body, the wheel-body having curved surfaces at its periphery struck upon radii from said pivots as centers, and springs supported on the wheel-body and yieldingly holding said buckets in a given relation to the wheel-body.

BERTRAND B. BUSH.

In presence of—
L. HEISLER,
J. H. LANDES.